United States Patent
Wu et al.

(10) Patent No.: US 10,628,614 B2
(45) Date of Patent: Apr. 21, 2020

(54) MOBILE COMMUNICATION DEVICE BASED ON VIRTUAL MOBILE INFRASTRUCTURE AND RELATED INPUT METHOD SWITCHING METHOD THEREOF

(71) Applicant: Industrial Technology Research Institute, Hsinchu (TW)

(72) Inventors: Ching-Hung Wu, Hsinchu County (TW); Kuei-Chun Liu, Taoyuan (TW); Yu-Yu Lai, Taichung (TW); Hsuan-Liang Chen, Hsinchu (TW); Yu-Chun Chiu, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 233 days.

(21) Appl. No.: 15/855,929

(22) Filed: Dec. 27, 2017

(65) Prior Publication Data

US 2019/0147195 A1 May 16, 2019

(30) Foreign Application Priority Data

Nov. 14, 2017 (TW) .............................. 106139305 A

(51) Int. Cl.
*G06F 21/83* (2013.01)
*H04M 1/725* (2006.01)
(Continued)

(52) U.S. Cl.
CPC .............. *G06F 21/83* (2013.01); *G06F 3/038* (2013.01); *G06F 3/04886* (2013.01);
(Continued)

(58) Field of Classification Search
CPC combination set(s) only.
See application file for complete search history.

(56) References Cited

U.S. PATENT DOCUMENTS

| 9,225,799 B1 | 12/2015 | Dong et al. |
| 9,300,720 B1 | 3/2016 | Qiu et al. |

(Continued)

FOREIGN PATENT DOCUMENTS

| CN | 101754466 A | 6/2010 |
| CN | 102427448 A | 4/2012 |

(Continued)

OTHER PUBLICATIONS

Taiwan Patent Office, Office Action, Patent Application Serial No. 106139305, dated Nov. 27, 2018, Taiwan.

(Continued)

*Primary Examiner* — Malcolm Cribbs

(57) ABSTRACT

A mobile communication device based on a virtual mobile infrastructure is provided, including: a display device for displaying a graphical user interface (GUI); a communication device for providing a network connection to a remote server; a storage device; and a controller for performing an input method switching method including the following operations during performing first application (APP) of remote server: displaying operation screen of first APP on GUI; receiving first notification indicating that remote input keyboard has enabled from remote server; in response, use local input keyboard of local input to cover remote input keyboard to enable a user uses local input method for inputting and to transmit user inputs to remote server to display user inputs on respective remote location; and receiving second notification indicating that remote input keyboard has disabled from remote server and in response, hide local input keyboard on operation screen.

18 Claims, 13 Drawing Sheets

(51) Int. Cl.
*G06T 3/40* (2006.01)
*G06F 3/0488* (2013.01)
*G06F 3/038* (2013.01)
*G06F 21/84* (2013.01)
*H04W 12/02* (2009.01)

(52) U.S. Cl.
CPC ............... *G06F 21/84* (2013.01); *G06T 3/40* (2013.01); *H04M 1/72583* (2013.01); *H04W 12/02* (2013.01)

(56) References Cited

U.S. PATENT DOCUMENTS

| | | | |
|---|---|---|---|
| 9,396,002 | B2 | 7/2016 | Liu et al. |
| 9,400,585 | B2* | 7/2016 | Momchilov .......... G06F 3/0481 |
| 9,444,912 | B1* | 9/2016 | Chen ....................... H04L 69/08 |
| 2007/0199058 | A1 | 8/2007 | Baumgart et al. |
| 2011/0276625 | A1 | 11/2011 | Shah |
| 2014/0289637 | A1 | 9/2014 | Coviello et al. |
| 2014/0365966 | A1 | 12/2014 | Deng et al. |
| 2016/0261923 | A1* | 9/2016 | Huang ................. H04N 7/0122 |
| 2017/0357441 | A1* | 12/2017 | Sanciangco ............. H04W 4/80 |

FOREIGN PATENT DOCUMENTS

| | | |
|---|---|---|
| CN | 102594992 A | 7/2012 |
| CN | 102834819 A | 12/2012 |
| CN | 104898965 A | 9/2015 |
| CN | 106295379 A | 1/2017 |
| CN | 107077379 A | 8/2017 |
| TW | 477956 B | 3/2002 |
| TW | I360762 | 3/2012 |
| TW | I546749 | 8/2016 |
| TW | I560553 | 12/2016 |

OTHER PUBLICATIONS

Hao et al., "A Secure Mobile Cloud Computing Platform," 2015 IEEE Conference on Computer Communications (INFOCOM), Apr. 2015, pp. 2668-2676, IEEE, US.

Kang et al., "Android-based SoD client for remote presentation," 13th International Conference on Advanced Communication Technology (ICACT2011), Feb. 2011, pp. 1162-1167, IEEE, US.

Cho et al., "Smartphone Virtualization for Bring Your Own Device (BYOD) Security," ICT Journal No. 165, Mar. 2016, pp. 57-67, ICT Journal, Taiwan.

Chen et al., "Smartphone virtualization Status and challenges," 2011 International Conference on Electronics, Communications and Control (ICECC), Sep. 2011, pp. 2834-2839, IEEE, US.

Chen et al., "Virtual Smartphone over IP," 2010 IEEE International Symposium on "A World of Wireless, Mobile and Multimedia Networks" (WoWMoM), Jun. 210, 6 pages, IEEE, US.

Skurski et al., "VNC-based remote control for Symbian OS smartphones," MIXDES 2009, 16$^{th}$ International Conference "Mixed Design of Integraed Circuits and Systems", Jun. 2009, pp. 171-174, Department of Microelectronics & Computer Science, Technical University of Lodz, Poland.

* cited by examiner

MOBILE COMMUNICATION DEVICE BASED ON VIRTUAL MOBILE INFRASTRUCTURE AND RELATED INPUT METHOD SWITCHING METHOD THEREOF

CROSS REFERENCE TO RELATED APPLICATIONS

The present application is based on, and claims priority from, Taiwan Application Serial Number 106139305, filed on Nov. 14, 2017, the disclosure of which is hereby incorporated by reference herein in its entirety.

TECHNICAL FIELD

The technical field relates to a mobile communication device based on a virtual mobile infrastructure and related input method control and switching method thereof.

BACKGROUND

With the increasing popularity of mobile devices such as smartphones and tablets, and the mature development of 3G and 4G mobile networks, more and more people are urged to handle business affairs through mobile devices and improve work efficiency. As a result, enterprises employee safety with Bring Your Own Device (BYOD) is gaining traction. BYOD is a way for employees to bring personal devices into the corporate network. As a result of BYOD, various threats may enter the enterprise through network loopholes caused by employees' omissions, which may cause data leakage and cause the risk of capital security. Therefore, the technology of Virtual Mobile Infrastructure (VMI) is widely used in BYOD management.

VMI operates as a VDI solution with all the data in the cloud. There is no stored application or APPs in mobile phones, so there is no need to worry about the risk of data leakage, thereby controlling data not being leaked. On the other hand, unlike traditional VDI Windows interface does not operate conveniently and requires a lot of system resources on the mobile phone, current VMI is configured on the operating system of the mobile phone, such as ANDROID or iOS, and the user can access the ANDROID/iOS APPS provided by enterprise with any device without limiting by hardware labels or operating systems and can make all feature calls of APP directly with the most intuitive APP operation without having to learn anything about the APP. VMI not only solves the problems of lack of computing power and unfriendly operation interface caused by performing VDI with a mobile phone, but also prevents data and APP from landing on the mobile phone through performing operations and accesses through the cloud, enabling the enterprise to achieve a goal for protecting employee privacy and reducing the risk of asset security. Accordingly, VMI is a new thinking of the enterprise BYOD management.

In the VMI architecture, the smoothness of the operation is definitely an important factor affecting the success or failure of the VMI. With the popularization of the 4G network and the investment of 5G, it is foreseeable that the network speed will not be a problem in the future, and the rest is how to improve the user experience. Most often encountered problems for improving the user experience may like the use of input method that requires human-machine interaction interface. Generally speaking, in the VMI architecture, the user must use various input methods such as standard input methods provided by the remote end (e.g., a cloud) for performing input operations. Once the mode of operation is changed or the degree of automation is insufficient, the user often has to resist rejection on use it.

In addition, although some current VMI architectures allow the use of a local input method for inputting to improve the user experience, however, there is a risk on the security worries due to the increasing rate of mobile device ransomware growth each year. For example, in a case where the user needs to input a password, if the user uses the existing local input method to perform the input operation, when the local mobile phone is invaded by the virus, the input signal of the local input method will be intercepted by the intentional person to make the password or other personal assets have been stolen/skipped, resulting in additional security concerns for the users.

SUMMARY

Mobile communication device based on a virtual mobile infrastructure (VMI) and related input method switching method thereof are provided.

An exemplary embodiment of a mobile communication device based on a virtual mobile infrastructure (VMI) includes a display device, a communication device, a storage device and a controller. The display device is configured to display a graphical user interface (GUI). The communication device is configured to provide a network connection to a remote server. The storage device is configured to store machine-readable instructions or program codes. The controller is operatively coupled to the communication device and the storage device, and is configured to load and execute instructions or program codes from the storage device to perform an input method switching method comprising the following operations during performing a first application (APP) of the remote server: displaying an operation screen of the first APP on the GUI; receiving a first notification indicating that a remote input keyboard of a remote input method has enabled from the remote server via the communication device; in response to the first notification, performing an activation operation of a local input method, using a local input keyboard of the local input method to cover the remote input keyboard displayed on the GUI via the display device to enable a user to use the local input method for inputting and to transmit user inputs to the remote server via the communication device to display the user inputs on respective remote location; and receiving a second notification indicating that the remote input keyboard has disabled from the remote server via the communication device and in response to the second notification, performing a hiding operation of the local input method to hide the local input keyboard displayed on the GUI via the display device.

In another exemplary embodiment, an input method switching method applied to a mobile communication device based on a virtual mobile infrastructure (VMI) is provided, wherein the mobile communication device is connected to a remote server via a network. The input method switching method comprises: displaying an operation screen for a first application (APP) of the remote server on a graphical user interface (GUI); receiving a first notification indicating that a remote input keyboard of a remote input method has enabled from the remote server; in response to the first notification, performing an activation operation of a local input method, using a local input keyboard of the local input method to cover the remote input keyboard displayed on the GUI to enable a user to use the local input method for inputting and to transmit user inputs to the remote server to display the user inputs on respective remote location via the network; and receiving a second notification indicating that the remote input keyboard has disabled from the remote server and in response to the second notification, performing a hiding operation of the local input method to hide the local input keyboard displayed on the GUI.

Methods disclosed above may be practiced by the mobile communication devices which are hardware or firmware capable of performing particular functions and may take the form of program codes embodied in a tangible media. When the program codes is loaded into and executed by an electronic device, a processor, a computer or a machine, the electronic device, the processor, the computer or the machine becomes an apparatus for practicing the disclosed method.

BRIEF DESCRIPTION OF THE DRAWINGS

The application will become more fully understood by referring to the following detailed description with reference to the accompanying drawings, wherein.

DETAILED DESCRIPTION OF EMBODIMENTS

Figure 1:
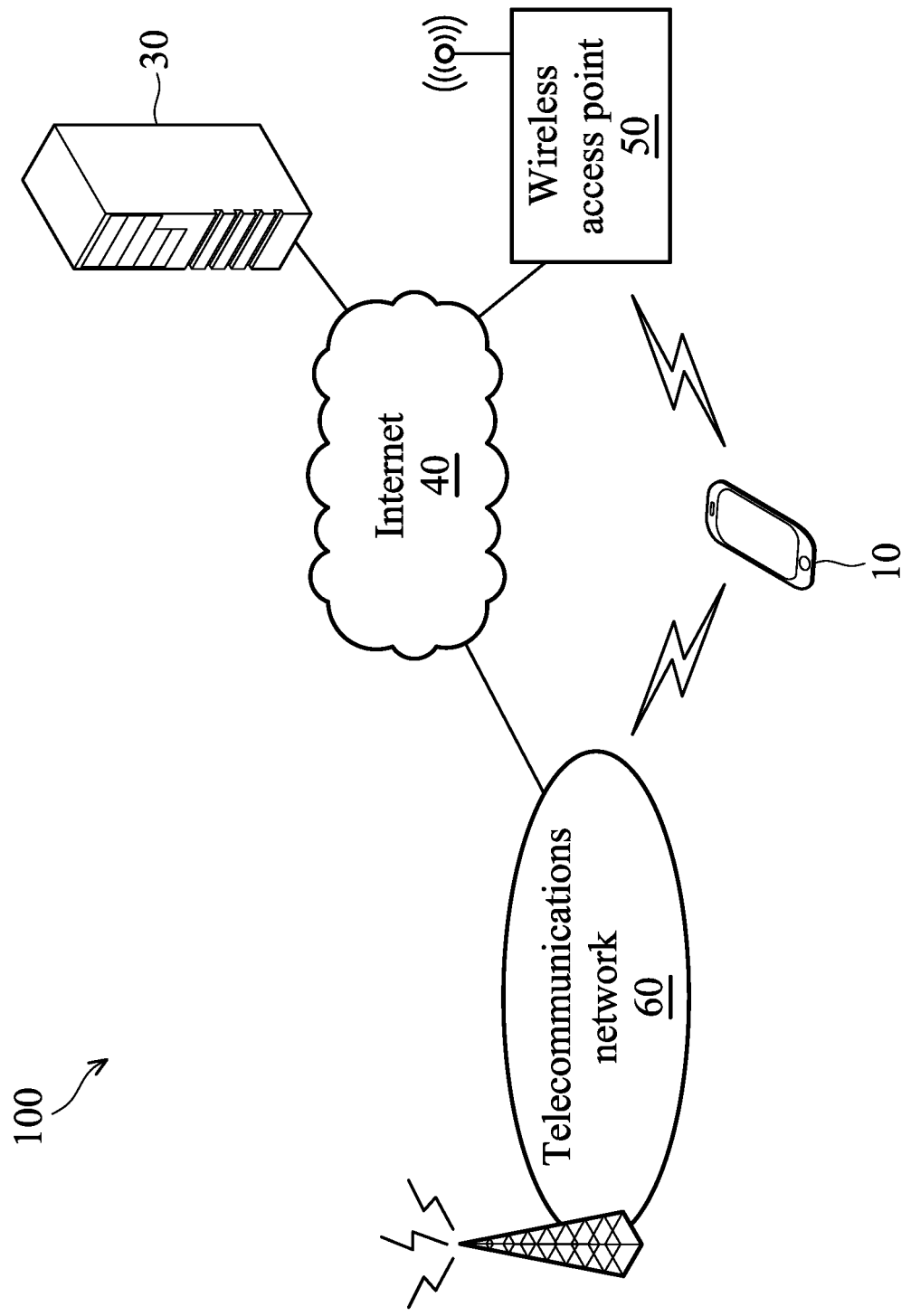
FIG. 1 is a schematic diagram of a virtual mobile infrastructure (VMI) environment according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that the embodiments may be realized in software, hardware, firmware, or any combination thereof.

Embodiments of the application provide an input method control process and an automatic switching mechanism of input methods based on a VMI architecture, which can flexibly switch between a remote input method and a local input method, thereby taking both user experience and fluency in use. Moreover, the embodiments of the present application can further provide an input method converter capable of bridging various ANDROID/iOS input methods such that a user can freely convert favorite or commonly used local input methods to perform various input operations, allowing the user to automatically switch local input method. Furthermore, the input method converter can automatically switch to the remote input method or enable safe mode to use the remote input method based on the attribute data for the input box, thus increasing the security of data transmission, better than any existing VMI methods, and having higher data security and effectively reducing the risk of misappropriation/skimming of important data by unauthorized persons.

FIG. 1 is a schematic diagram of a virtual mobile infrastructure (VMI) environment 100 according to an embodiment. The VMI environment 100 comprises one or more mobile communication devices 10, a remote server 30, an Internet 40, a wireless access point 50, and a telecommunications network 60, wherein each mobile communication devices 10 comprising a mobile device that runs a mobile operating system. For example, the mobile communication device 10 may be a computing device with a network communication function, such as a notebook computer, a smartphone, a tablet or other portable device or handheld device, as long as it can support the wireless technology used by the wireless access point 50 and/or telecommunications network 60.

The mobile communication device 10 can be used by the user at the client and connected to the Internet 40 via the wireless access point 50. The mobile communication device 10 may also be connected to the Internet 40 through the telecommunication network 60. By connecting to the Internet 40, the mobile communication device 10 can perform VMI operations with the remote server 30, and the mobile communication device 10 can communicate with the remote server 30 to access a remote mobile operating system running on the remote server 30 via the Internet 40. In one embodiment, the mobile operating system of the mobile communication device 10 may be the same as a corresponding remote mobile operating system running on the remote server 30. For example, the mobile communication device 10 and the remote server 30 each comprises a smartphone or tablet that runs the ANDROID/iOS operating system. The remote mobile operating system including the ANDROID/iOS operating system may include multiple remote applications (also referred to as "APPs"). A user of the mobile communication device 10 accesses the remote APPs on the remote ANDROID/iOS operating system as if the remote apps are running on the mobile communication device 10. For example, a screen image of the remote ANDROID/iOS operating system is displayed on the touchscreen of the mobile communication device 10. This is particularly advantageous in workplaces that allow employees to use their own personal mobile client devices. More particularly, employees with different mobile communication devices 10 can work on remote apps running on remote mobile operating systems that are owned and managed by their employers. For the illustration purpose, in the following embodiments, the ANDROID/iOS operating system running on the mobile communication device 10 is also referred to as a "local operating system" and the ANDROID/iOS operating system running on the remote server 30 is also referred to as a "remote operating system", but the application is not limited thereto. Similarly, an application executed on the remote ANDROID/iOS operating system is called a remote application (hereinafter referred to as a "remote APP") and an application executed on the client's local ANDROID/iOS operating system is called a client application (Hereinafter referred to as a "client APP"). The user may access the remote APP executed on the remote ANDROID/iOS operating system on the mobile communication device 10 through the client APP. In one embodiment, the mobile operating system of the mobile communication device 10 and the corresponding remote mobile operating system may be the same mobile operating system. In other embodiments, the mobile operating system of the mobile communication device 10 and the corresponding remote mobile operating system may be different mobile operating systems. For example, the mobile communication device 10 may run an iOS operating system and the remote mobile operating system run by the remote server 30 may be an ANDROID operating system, or the mobile communication device 10 runs an ANDROID operating system while the remote mobile operating system is an iOS operating system.

The wireless access point 50 may establish a wireless LAN by using short-range wireless technologies, such as Wireless Fidelity (WiFi) technology, Bluetooth technology, Zigbee technology and the like to provide wireless communication service to the mobile communication device 10. The wireless access point 50 may be connected to a wired area network via an Ethernet cable and then to the Internet 40 through a wired area network. The function of the wireless access point 50 is to receive, temporarily store, transmit data traffic of the communication device 10. In general, if the short-range wireless technology used by the wireless access point 50 is a WiFi technology, the wireless access point 50 will have unequal coverage with an average from 20 meters (at the place where there are obstacles such as a wall, a stairwell, an elevator, etc.) to 100 meters (in open and empty spaces).

The telecommunications network 60 may be a Global System for Mobile communications (GSM), General Packet Radio Service (GPRS) system, Enhanced Data rates for Global Evolution (EDGE) system, Wideband Code Division Multiple Access (WCDMA) system, Code Division Multiple Access 2000 (CDMA-2000) system, Time Division-Synchronous Code Division Multiple Access (TD-SCDMA) system, Worldwide Interoperability for Microwave Access (WiMAX) system, Long Term Evolution (LTE) system, and Time-Division LTE (TD-LTE) system, etc., depending on the wireless technology used. It is mainly responsible for establishing a wireless wide area network to provide wireless communication services to the mobile communication device 10.

Figure 2:
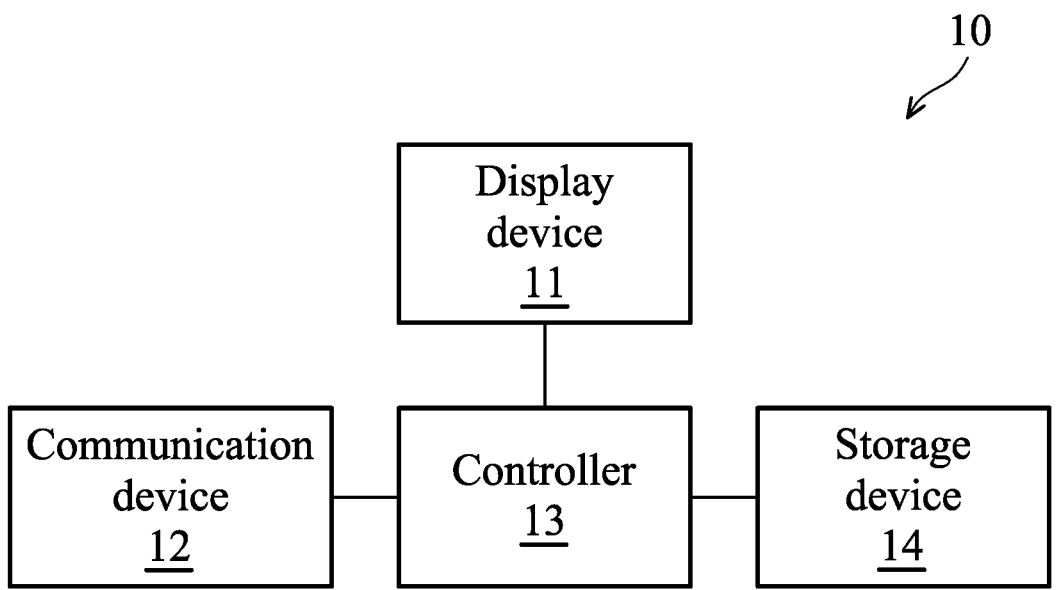
FIG. 2 is a schematic diagram of a hardware architecture of a mobile communication device according to an embodiment.

FIG. 2 is a schematic diagram of a hardware architecture of a mobile communication device according to an embodiment. As shown in FIG. 2, the mobile communication device 10 comprises at least a display device 11, a communication device 12, a controller 13, and a storage device 14.

The display device 11 may be a Liquid-Crystal Display (LCD), Light-Emitting Diode (LED) display, or Electronic Paper Display (EPD), etc., for displaying graphical user interface. In another embodiment, the display device 11 may further comprise one or more touch sensors disposed thereon or thereunder for sensing touches, contacts, or approximations of objects, such as fingers or styluses, to provide man-machine interface operation of the touch mode so that the display device 11 becomes a display device with a touch detection function.

The communication device 12 is configured to provide connection to the Internet 40 and to the remote server 30 via the Internet 40. The communication device 12 may provide a wireless area/wide area network connection according to at least one specific communication technology as long as the specific communication technology compatible with the communication technology used by the telecommunication network 60. For example, the communication device 12 may include a combination of a wireless-network-enabled radio frequency device, baseband device, and antenna. In another embodiment, the communication device 12 may further provide a wired network connection. For example, the communication device 12 may include an Ethernet card.

The controller 13 may be a general-purpose processor, Micro-Control Unit (MCU), Application Processor (AP), Digital Signal Processor (DSP), or the like, which may include various types of circuitry for providing functions of data processing and calculation, transmitting screen (including: text, images, videos) data to the display device 11, controlling the operation of the communication device 31 to provide network connection, and reading data from or storing data to the storage device 33. In particular, the controller 13 is configured to read program codes of the application from the storage device 14 to run the operating system and execute the client APP. More particularly, the controller 32 is configured to coordinate the operations of the display device 11, the communication device 12 and the storage device 14 for performing the input method switching method of the present application when during performing a first application (APP) of the remote server. In some embodiments, the input method switching method may include: displaying an operation screen of the first APP on the GUI; receiving a first notification indicating that a remote input keyboard has enabled from the remote server via the communication device; in response to the first notification, performing an activation operation of a local input method, using a local input keyboard of the local input method to cover the remote input keyboard displayed on the GUI via the display device to enable a user to use the local input method for inputting and to transmit user inputs to the remote server via the communication device to display the user inputs on respective remote location; and receiving a second notification indicating that the remote input keyboard has disabled from the remote server via the communication device and in response to the second notification, performing a hiding operation of the local input method to hide the local input keyboard displayed on the GUI via the display device.

As will be appreciated by persons skilled in the art, the circuitry in the controller 13 will typically comprise transistors that are configured in such a way as to control the operation of the circuitry in accordance with the functions and operations described herein. As will be further appreciated, the specific structure or interconnections of the transistors will typically be determined by a compiler, such as a register transfer language (RTL) compiler. RTL compilers may be operated by a processor upon scripts that closely resemble assembly language code, to compile the script into a form that is used for the layout or fabrication of the ultimate circuitry.

The storage device 14 may be a non-transitory computer-readable storage medium such as a random access memory (RAM), a flash memory, or a hard disk, a an optical disc, or any combination thereof for storing program codes of instruction sets, communication protocol or applications. Specifically, the storage device 14 may further store the instruction sets or program codes of the disclosed method, which can be loaded and executed by the controller 13. The program codes stored in the storage device 14 generally includes program codes of an operating system, one or more applications, a simulation system, or a simulation application and/or simulation hardware platform of any of various operating systems, a simulation operating system, and so on. In some embodiments, these elements are stored in the storage device 14 and executed by the controller 13. For example, the storage device 14 may store program codes of a mobile operating system such as an ANDROID/iOS operating system or other similar mobile operating system, and the program codes of mobile operating systems stored in the storage device 14 can be loaded and executed by the controller 13 to run the mobile operating system and execute one or more client APPs through the mobile operating system.

In one embodiment, the storage device 14 may further store program codes of an input method switching controller, and the controller 13 may load the program codes of an input method switching controller in the storage device 14 to execute the input method switching controller. The input method switching controller can, when being loaded and executed by the controller 13, perform the input method switching method of the present application.

It should be understood that the components described in the embodiment of FIG. 2 are for illustrative purposes only and are not intended to limit the scope of the application. For example, in some embodiments, the mobile device 10 may further comprise one or more buttons, a keyboard, a mouse, a touch pad, a power supply, a microphone, a speaker, and/or a GPS device, etc.

Figure 3:
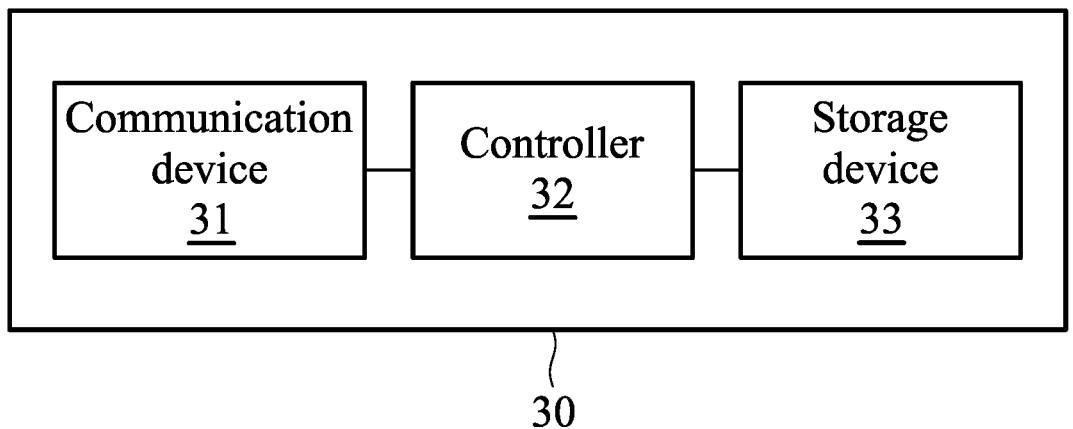
FIG. 3 is a schematic diagram of a hardware architecture of a remote server according to an embodiment.

FIG. 3 is a schematic diagram of a hardware architecture of a remote server 30 according to an embodiment. The remote server 30 includes at least a communication device 31, a controller 32, and a storage device 33.

The communication device 31 is configured to provide connection to the Internet 40 and to the mobile communication device 10 via the Internet 40. The communication device 31 may provide a wired or wireless network connection according to at least one specific communication technology, such as an Ethernet, a wireless area network, or a wireless wide area network. For example, the communication device 31 may include a wired-network-enabled Ethernet card or a combination of a wireless-network-enabled radio frequency device, baseband device, and antenna.

The controller 32 may be a general-purpose processor, Micro-Control Unit (MCU), Application Processor (AP), Digital Signal Processor (DSP), or the like, which may include various types of circuitry for providing functions of data processing and calculation, controlling the operation of the communication device 31 to provide network connection, and reading data from or storing data to the storage device 33. More particularly, the controller 32 is configured to coordinate the operations of the communication device 31 and the storage device 33 for performing the input method switching method of the present application.

As will be appreciated by persons skilled in the art, the circuitry in the controller 32 will typically comprise transistors that are configured in such a way as to control the operation of the circuitry in accordance with the functions and operations described herein. As will be further appreciated, the specific structure or interconnections of the transistors will typically be determined by a compiler, such as a register transfer language (RTL) compiler. RTL compilers may be operated by a processor upon scripts that closely resemble assembly language code, to compile the script into a form that is used for the layout or fabrication of the ultimate circuitry.

The storage device 33 may be a non-transitory computer-readable storage medium such as a random access memory (RAM), a flash memory, or a hard disk, a an optical disc, or any combination thereof for storing program codes of instruction sets, communication protocol or applications. Specifically, the storage device 33 may further store the instruction sets or program codes of the disclosed method, which is loaded and executed by the controller 32. The program codes stored in the storage device 33 generally includes program codes of an operating system, one or more applications, a simulation system, or a simulation application and/or simulation hardware platform of any of various operating systems, a simulation operating system, and so on. For example, the storage device 33 may store program codes of a mobile operating system such as an ANDROID/iOS operating system or other similar mobile operating system, and the program codes of mobile operating systems stored in the storage device 33 can be loaded and executed by the controller 32 to run the mobile operating system and execute one or more remote APPs through the mobile operating system.

It should be understood that the components described in the embodiment of FIG. 3 are for illustrative purposes only and are not intended to limit the scope of the application. For example, in some embodiments, the remote server 30 may further comprise one or more buttons, a keyboard, a mouse, a touch pad, a video camera, a microphone, a display screen (such as a liquid crystal display, a light emitting diode display, an electronic paper display, etc.) and/or a speaker, etc., serving as the Man-Machine Interface (MIMI) for interaction with users.

In one embodiment, a control flow for a dual-mode input method is provided. In the embodiments, the dual-mode input method includes a remote input method provided by the remote server 30 and a local input method on a mobile communication device 10 (e.g., a mobile phone) used by a user, such as Chinese and English input method, handwriting input method, voice input method, phonetic input method, etc., but the application is not limited thereto. In general, the operating system provides an input method with a corresponding input method editor (IME) that allows a user to enter text through a virtual or touch keyboard displayed by the IME. When the user clicks on an input field or input box of an APP, the preconfigured virtual keyboard (also referred to as a software keyboard or IME) will pop up to be displayed on a display device (for example, a touch screen). Then, the user can use this virtual keyboard to enter content into the input field of the application. Hereinafter, the input method or the input method editor provided by the remote server 30 is referred to as a "remote input method", and the corresponding virtual keyboard of the remote input method is referred to as a "remote input keyboard". The input method or input method provided by the mobile communication apparatus 10 on the user side is referred to as a "local input method" and the corresponding virtual keyboard of the local input method is referred to as a "local input keyboard". The remote input method provides a remote input keyboard for the user to input texts through the remote operation system. The local input method provides a local input keyboard for the user to input texts through the local input keyboard. In one embodiment, the mobile communication device 10 can provide text inputs to the corresponding remote operating system by using the local input method of the local operating system. In one embodiment, the remote server 30 may display an operation screen of the remote operating system on the mobile communication device 10 for the user to perform related operations on the local terminal. It should be noted that, in the present application, the client or the local end may be interchangeably used to indicate the operation on the mobile communication device 10 and the remote end represents the operation on the remote server 30. The remote end and the local end can use a response message and a request message for message transmission. Detailed format and usage of the message will be described in the following paragraphs.

Figure 4A:
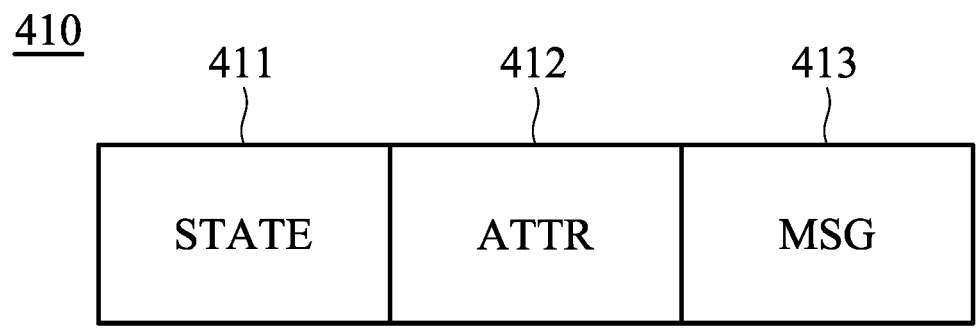
FIG. 4A is a schematic diagram illustrating an exemplary embodiment of a format of a response message according to an embodiment.

FIG. 4A is a schematic diagram illustrating an exemplary embodiment of a format of a response message 410 according to an embodiment. The response message 410 is a message sent from the remote end to the local end. As shown in FIG. 4A, the format of the response message 410 includes at least three data fields of state (STATE) 411, attribute (ATTR) 412, and message (MSG) 413. The STATE field 411 indicates a state of the remote input keyboard to inform the local end about enablement or disablement of the remote keyboard. In an embodiment, the STATE field 411 indicates the state of the keyboard with the number "0" or "1", and the value of the STATE field is set to "1" when the remote input keyboard is enabled (e.g., being popped up or turned on) while the value of the STATE field is set to "0" when the remote keypad is disabled (e.g., being folded or turned off). The ATTR field 412 indicates the attribute data for the input box, which is used to inform the local end about whether the attribute data for the input box is a normal box or an encryption box to be used as a basis for subsequent safe mode determination and the switching of the input methods. In one embodiment, the ATTR field 412 indicates the attribute data for the input box with the number "0" or "1", and the value of the ATTR field is set to "0" when the attribute data for the input box is a normal box while the value of the ATTR field is set to "1" when the attribute data for the input box is an encryption box.

The MSG field 413 indicates identification information of the APP currently activated, such as the APP name, type, version number and so on, for informing the local end about the identification data of the APP currently activated in the remote end to be used as a basis for subsequent local input method bridging. In one embodiment, the MSG field 413 may inform the local end about the identification information, such as the name, type, version number, etc. of the currently activated APP.

To be more specific, a remote resident program (hereinafter also referred to as a "remote daemon") may generate a corresponding response message according to the state of the remote input keyboard, the attribute data for the input box and/or the identification information of the currently-activated APP returned by the remote operation system, and send the response message to the local end. When the local end receives the response message from the remote end, the local end can determine whether the remote input keyboard is enabled according to the data in the state field, and determines whether the attribute data for the input box is a normal box or an encryption box according to the data in the attribute field, and obtain the identification information of currently-activated APP from the data in the message field within the response message and then performs respective processing based on these data. For example, the respective processing may include: when the attribute data for the input box is an encryption box, activating the safe mode to forbid the use of the local input method; when the remote input keyboard is enabled, performing an activation operation of the local input keyboard; when the remote input keyboard is disabled or tuned off, performing a hiding operation of the local input keyboard and/or generating a converted character string according to the identification information of the currently-activated APP, but the application is not limited thereto.

Figure 4B:
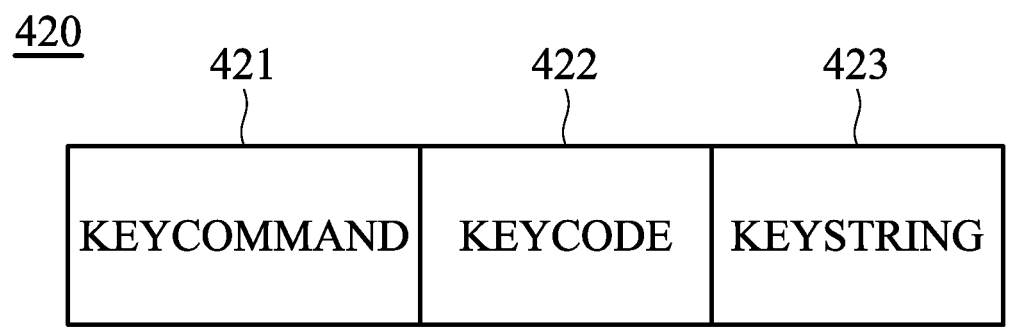
FIG. 4B is a schematic diagram illustrating an exemplary embodiment of the format of a request message according to an embodiment.

FIG. 4B is a schematic diagram illustrating an exemplary embodiment of the format of a request message according to an embodiment. The request message is a message sent from the local end to the remote end. As shown in FIG. 4B, the format of the request message 420 includes at least three data fields of key command (KEYCOMMAND) 421, key code (KEYCODE) 422, and key string (KEYSTRING) 423. The KEYCOMMAND field 421 indicates a type of the transmission command to inform the remote end about the type of the command indicated by the request message. The KEYCODE field 422 indicates the key code data input by the local user, and the KEYSTRING field 423 indicates the string data input by the local user. In one embodiment, the KEYCOMMAND field 421 may represent one of the following command types: an input box height command TYPE_HEIGHT, a key code command TYPE_KEYCODE and a string command TYPE_STRING, but the application is not limited thereto.

For example, when the KEYCOMMAND field is "TYPE_HEIGHT", it indicates that the request message is an input field height command and thus the following key value fields include information such as the width and height of the input field. When the KEYCOMMAND field is "TYPE_KEYCODE", it indicates that the request message is a key code command and the following key value fields include the key code data. When the KEYCOMMAND field is "TYPE_STRING", it indicates that the request message is a string command and thus the following key string field includes string data. In one embodiment, when the KEYCOMMAND, KEYCODE, and KEYSTRING fields of a request message are "TYPE_STRING", ",", "abc", respectively, the remote end may parse it to obtain the character string input by the user as "abc" so that "abc" can be displayed at the corresponding display position of the remote screen. It should be understood that, in this embodiment, the remote end may select the data of the key code field or the key string field for parsing according to the type of the command indicated by the KEYCOMMAND field of the request message, and the data of the unselected field can be ignored. For example, when the data of the KEYCOMMAND field of a request message is "TYPE_STRING", the remote end may only parse the data of the key string field, even if the key code field has a first data, the remote end can ignore the first data or do not parse the first data.

Specifically, the client APP may record the type of the local input method selected by the user, the key value or the key string of the input key, and generate a corresponding request message and send the request message to the remote end. When the remote end receives the request message from the local end, the remote end may determine the type of the command represented by the request message according to the data of the KEYCOMMAND field in the request message and parse the data in the key code field or the key string field according to the command type thereof for subsequent processing. For example, when the KEYCOMMAND field of a request message is "TYPE_HEIGHT", the remote end may parse the request message as an input box height command so that a width, height and other data on of an input box can be obtained in the following key code field; when the KEYCOMMAND field is "TYPE_KEYCODE", the remote end can parse the request message as a key code command, so the key code data can be obtained in the following key code field; and when the KEYCOMMAND field is "TYPE_STRING", the remote end can parse the request message as a string command and thus the string data can be obtained from the following key string field, but the application is not limited thereto.

Figure 5:
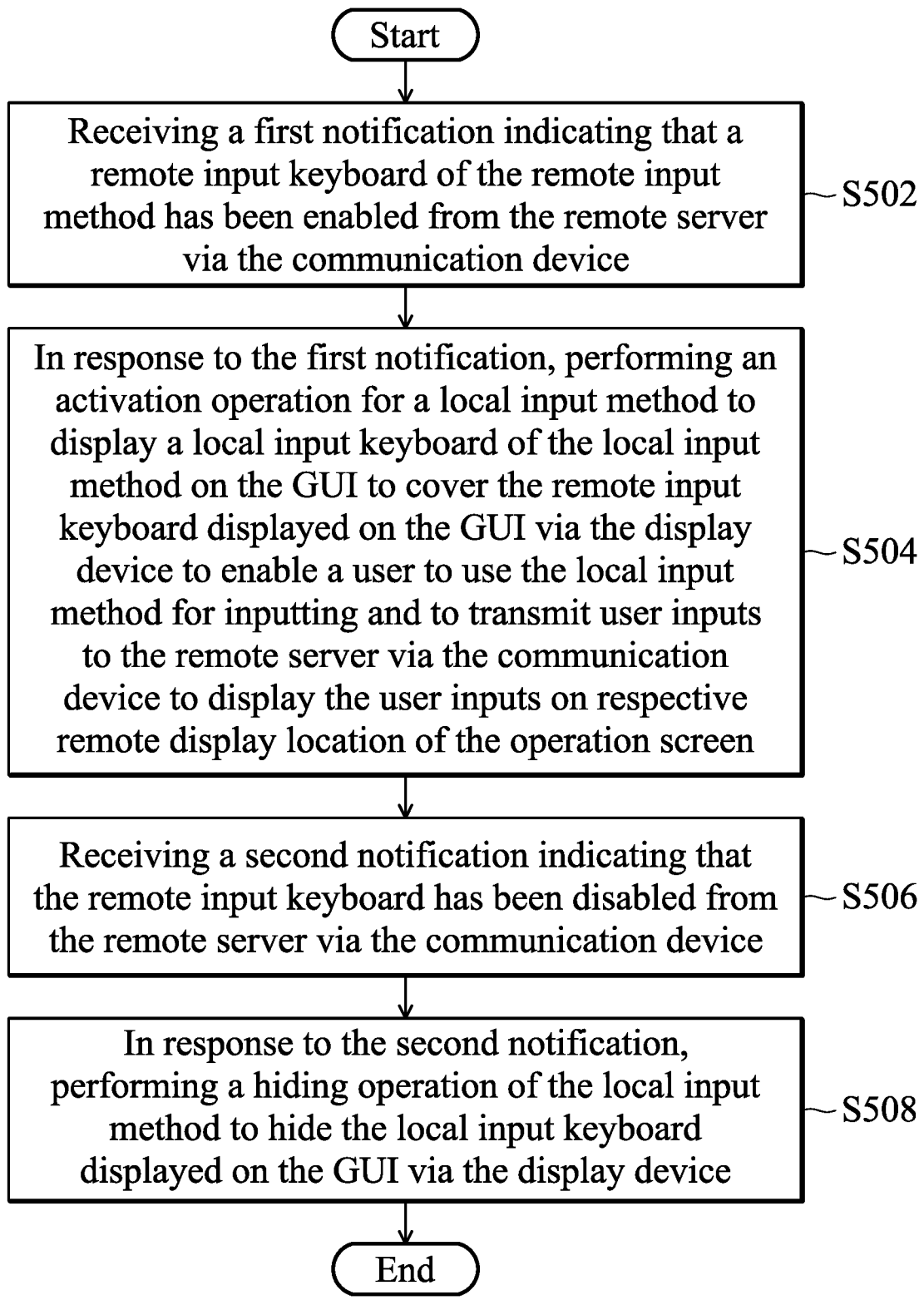
FIG. 5 is a flowchart of an input method switching method according to an embodiment.

FIG. 5 is a flowchart of an input method switching method according to an embodiment. Please refer together with FIG. 1, FIG. 2 and FIG. 5. The input method switching method of the application may be applied to a mobile communication device, such as the mobile communication device 10 as shown in FIG. 1 and performed by the controller 13.

In this embodiment, as shown in FIG. 2, the mobile communication device 10 comprises a display device 11, a communication device 12, a controller 13, and a storage device 14, wherein the display device 11 is configured to display a GUI for the user to interacts with the mobile communication device 10, the communication device 12 is configured to provide network connection to the remote server 30 in the VMI. The storage device 14 is configured to store a plurality of computer readable instructions or program codes. The controller 13 is coupled to the communication device 12 and the storage device 14 for loading and executing the above-mentioned instructions or program codes from the storage device 14 to perform the input method switching method of the application during performing executing a first APP of the remote server 30. Specifically, when the user operates the first APP (remote APP) of the remote server 30, the mobile communication device 10 displays an operation screen of the first APP on the GUI of the display device 11.

When the user wants to perform an input operation (e.g., clicking on an input field or an input box on the remote operation screen) on the remote operation screen and causes the remote input keyboard to pop up, in step S502, the remote operating system run in the remote server 30 sends a first notification indicating that the remote input keyboard of the remote input method has been enabled to the mobile communication device 10 such that the mobile communication device 10 receives the first notification from the remote server 30 indicating that a remote input keyboard has been enabled via the communication device 12. In one embodiment, the remote server 30 may set the value of the state field 411 in the response message 410 of FIG. 4A to be "1" to generate the aforementioned first notification indicating that the remote input keyboard of the remote input method has been enabled.

Next, in step S504, in response to the first notification, the mobile communication device 10 performs an activation operation for a local input method to display a local input keyboard of the local input method on the GUI and use the local input keyboard of the local input method to cover the remote input keyboard displayed on the GUI via the display device 11 to enable a user to use the local input method for inputting and to transmit user inputs to the remote server 30 via the communication device 12 to display the user inputs on respective remote display location of the operation screen. In one embodiment, the mobile communication device 10 may set the KEYCOMMAND field 421 in the response message 420 of FIG. 4B to be "TYPE_STRING" and fill in the following key string field 423 with the corresponding string data corresponding to the user content to send the user inputs to the remote server 30.

In some embodiments, assuming that the local input method includes a first input method, the mobile communication device 10 may send a first screen adjustment notification to the remote server 30 via the communication device 12 in response to the first notification, wherein the first screen adjustment notification includes the height and width information for a first input keyboard of the first input method, such that the remote server 30 may adjust a displayed keyboard position according to the height and width information of the first input keyboard, so as to prevent part of the inputs from being covered by the displaying of the first input keyboard.

Thereafter, when the user finishes the input operation and closes the remote input keyboard, in step S506, the remote operating system run on the remote server 30 sends a second notification indicating that the remote input keyboard has disabled to the mobile communication device 10, such that the mobile communication device 10 receives the second notification indicating that the remote input keyboard has been disabled from the remote server 30 via the communication device 12, and in response to the second notification, in step S508, performs a hiding operation of the local input method to hide the local input keyboard displayed on the GUI via the display device 11. In one embodiment, the remote server 30 may set the value of the state field 411 in the response message 410 of FIG. 4A to be "0" to generate the above-mentioned second notification indicating that the remote input keyboard has disabled.

Figure 6:
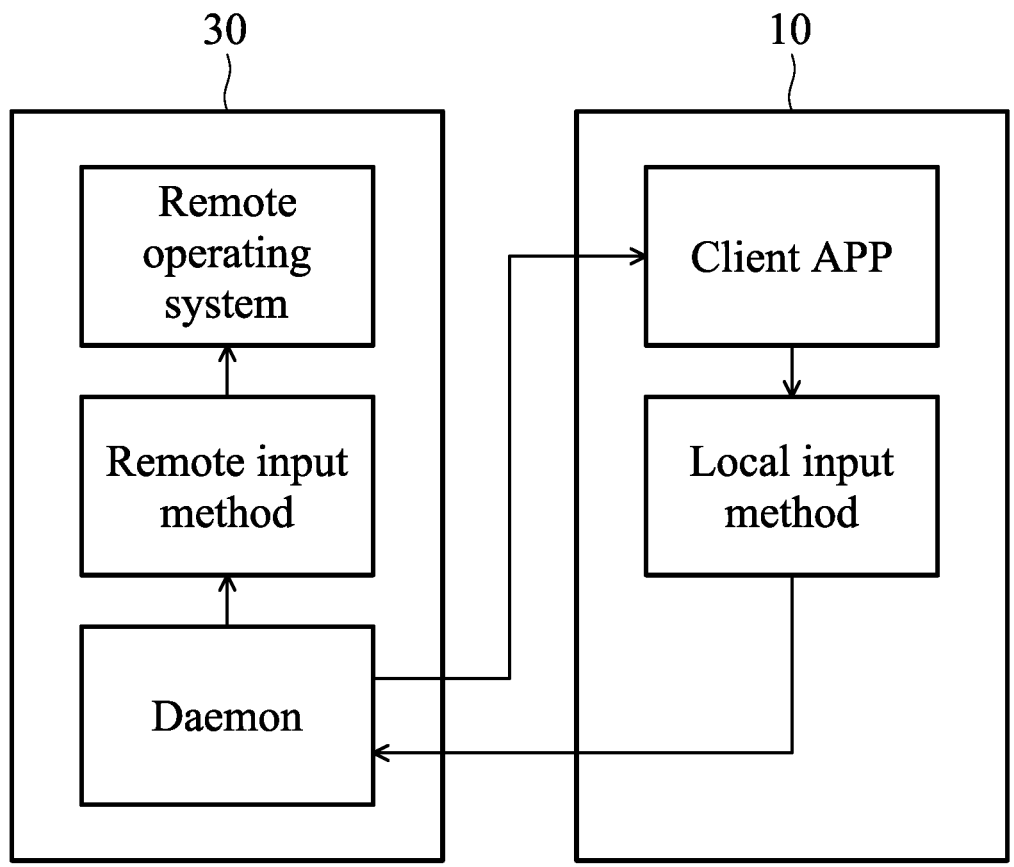
FIG. 6 is a schematic diagram of a VMI environment according to another embodiment.

FIG. 6 is a schematic diagram of a VMI environment according to another embodiment for further illustrating the implementation details of the input method switching method of the present application. The VMI environment as shown in FIG. 6 comprises a mobile communication device 10 and a remote server 30. The remote server 30 may include software modules, such as a remote operation system, a remote input method, a daemon or the like, and the mobile communication device 10 may include software modules, such as a client APP and a local input method. In this embodiment, the daemon is a software module that includes protocols that handles the overall VMI protocol, which can be composed of program codes and can be loaded into the remote server 30 by the controller 32. The remote operating system and the remote input method can be composed of programs codes and can be loaded into the remote server 30 by the controller 32. Similarly, the client APP and the local input method can be composed of program codes and can be loaded into the mobile communication device 10 by the controller 13. The daemon may establish a connection with the client APP for data transmission. The daemon may send the response message generated by the remote server 30 to the mobile communication device 10 or receive the request message from the mobile communication device 10. The client APP may also receive the response message from the remote server 30 or transmit the request message generated by the mobile communication device 10 to the remote server 30 through the established connection.

Figure 7:
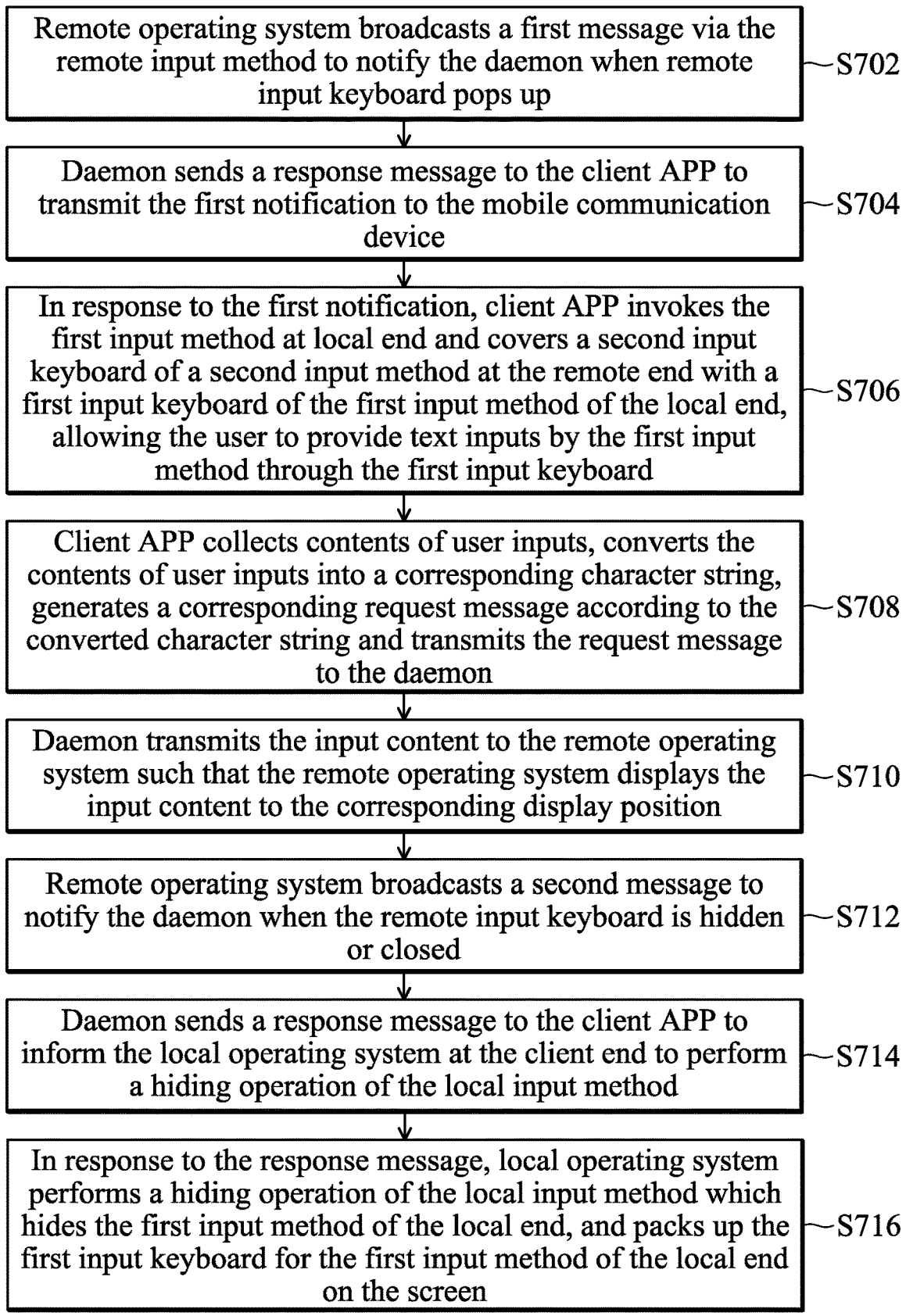
FIG. 7 is a flowchart of an input method switching method according to another embodiment.

FIG. 7 is a flowchart of an input method switching method according to another embodiment. Please refer together with FIG. 1, FIG. 2, FIG. 6 and FIG. 7. The input method switching method of the application may be applied to the VMI environment described in FIG. 6 and may be used for a switching operation of an input method between a local end (i.e., the mobile communication device 10) and a remote end (i.e., the remote server 30).

First, when a user of the mobile communication device 10 wants to perform an input operation on a remote screen to cause the remote input keyboard to be popped up, the remote operating system broadcasts a first message via the remote input method to notify the daemon (step S702). When the daemon receives the first message sent by the remote operating system, the daemon sends a response message to the client APP to transmit the first notification to the mobile communication device 10 (step S704). The response message contains data indicating that the remote input keyboard has been enabled or opened. For example, the value of the state field is set to be "1". In some embodiments, the daemon may simultaneously notify the remote operating system to adjust the remote (WebRTC) screen so that the remote input keyboard will not cover the display data displayed on the remote screen. Specifically, the remote input keyboard is displayed in a fixed position on the screen. However, different APPs may have different display modes. If the screen displaying does not properly adjusted, the remote input keyboard corresponding to the remote input method may cover part of display data on the remote screen. Therefore, the input controlling method of the application can further adjust the original remote screen based on the width and height data for the keyboard of the remote input method. For example, the remote screen can be dynamically adjusted according to the width and height data of the remote input method. When it is determined that the keyboard of the remote input method may cover the previously displayed data, the original display screen may be properly move up such that the keyboard of the remote input method does not obscure the input data on the remote screen.

In response to receiving the response message sent by the remote daemon, the client APP invokes the first input method at the local end and cover a second input keyboard of a second input method at the remote end with a first input keyboard of the first input method of the local end, allowing the user to provide text inputs by the first input method through the first input keyboard (step S706). The first input keyboard may include a plurality of input virtual keys corresponding to the first input method, and the user may input the texts by operating these virtual keys. For example, if the first input method is a Phonetic input method, the user can input the character "掰" by operations of pressing virtual keys "ㄅ", "ㄞ" and the Enter key. In some embodiments, the first input method may be a voice or handwriting input method, and the first input keyboard may be a corresponding voice or handwriting input interface to allow a user to input text characters by handwriting or voice.

Next, the client APP collects contents of user inputs, converts the contents of user inputs into a corresponding character string, and generates a corresponding request message according to the converted character string and transmits the request message to the daemon (step S708). The above request message includes three data fields of key command, key code, and key string, as shown in FIG. 4B. For example, when the user presses the virtual keys "ㄅ", "ㄞ", and the Enter key to input "掰" by using the first input keyboard, the client APP may respectively collect the corresponding keyboard positions of "ㄅ", "ㄞ" and the Enter key input by the user, to generate a string "掰" according to the combination of these keyboard positions, and then generate a request message to the remote daemon, wherein in the request message, the KEYCOMMAND field is set to be "TYPE_STRING" and the key string field is set to be "掰".

When the daemon receives the request message from the client, the daemon parses the received request message to acquire the input content and transmits the input content to the remote operating system, such that the remote operating system displays the input content to the corresponding display position (step S710). In step S710, the input content may be obtained according to data in the key code field and the key string field of the request message. Therefore, the remote operating system will display the word "掰" on the remote screen.

When the remote input keyboard is hidden or closed due to that the user finishes the input operation, the remote operating system broadcasts a second message to notify the daemon (step S712). When the daemon receives the second message sent by the remote operating system, the daemon sends a response message to the client APP to inform the local operating system at the client end to perform a hiding operation of the local input method (step S714). The above response message contains information indicating that the keyboard is disabled or close, for example, the value of its state field is set to be "0". In response to the response message sent by the remote daemon, the local operating system of the client end performs a hiding operation of the local input method which hides the first input method of the local end, and packs up the first input keyboard for the first input method of the local end on the screen (S716).

Figure 8A:
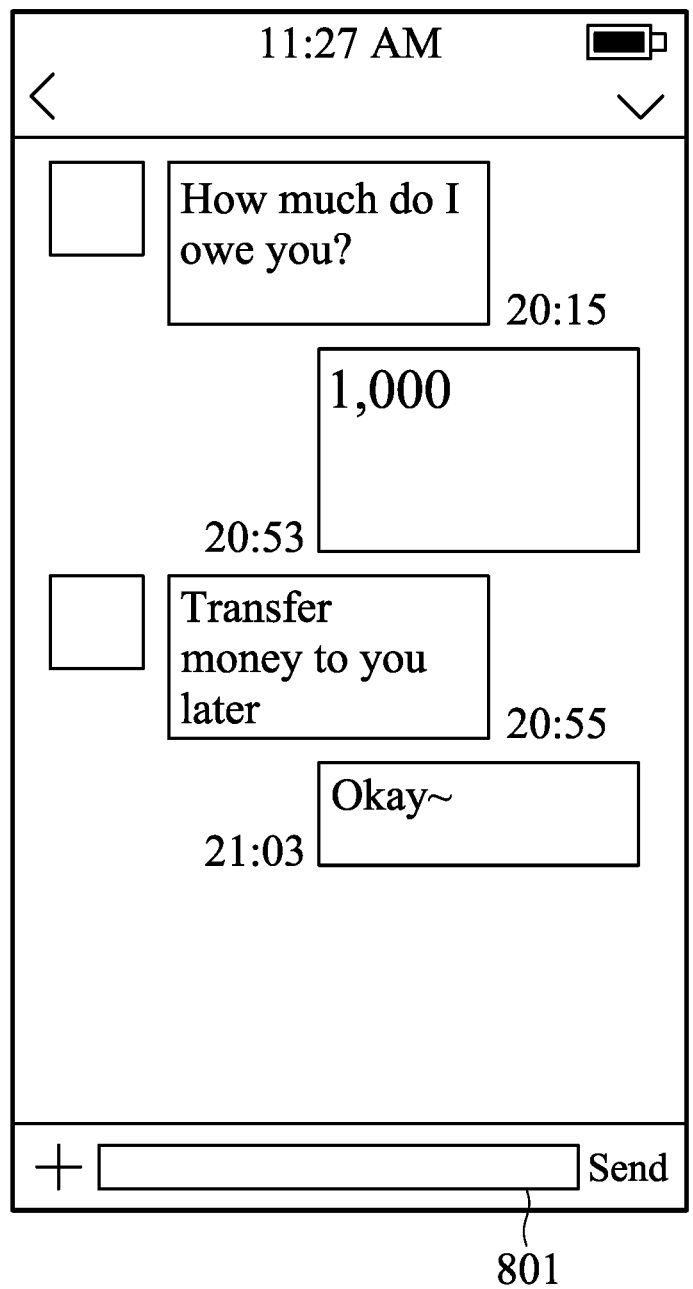
FIGS. 8A to 8E are schematic diagram illustrating exemplary embodiments of operation screens for the input method switching.
Figure 8B:
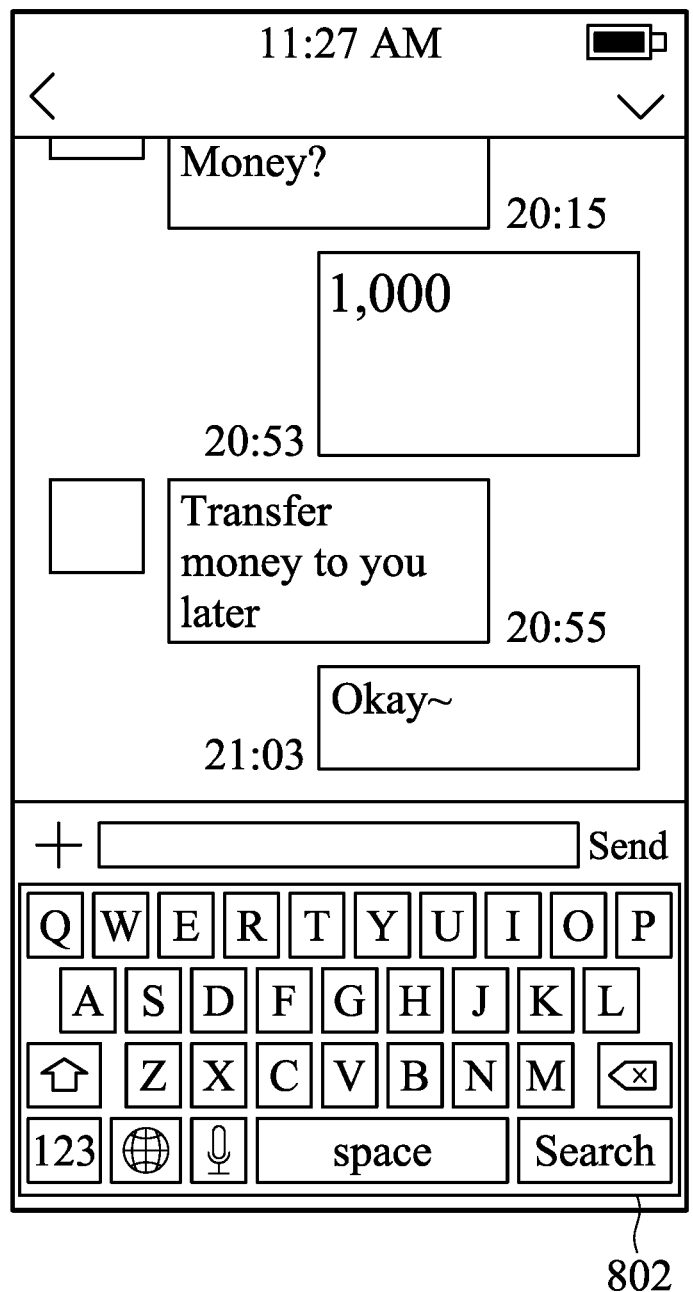
Figure 8C:
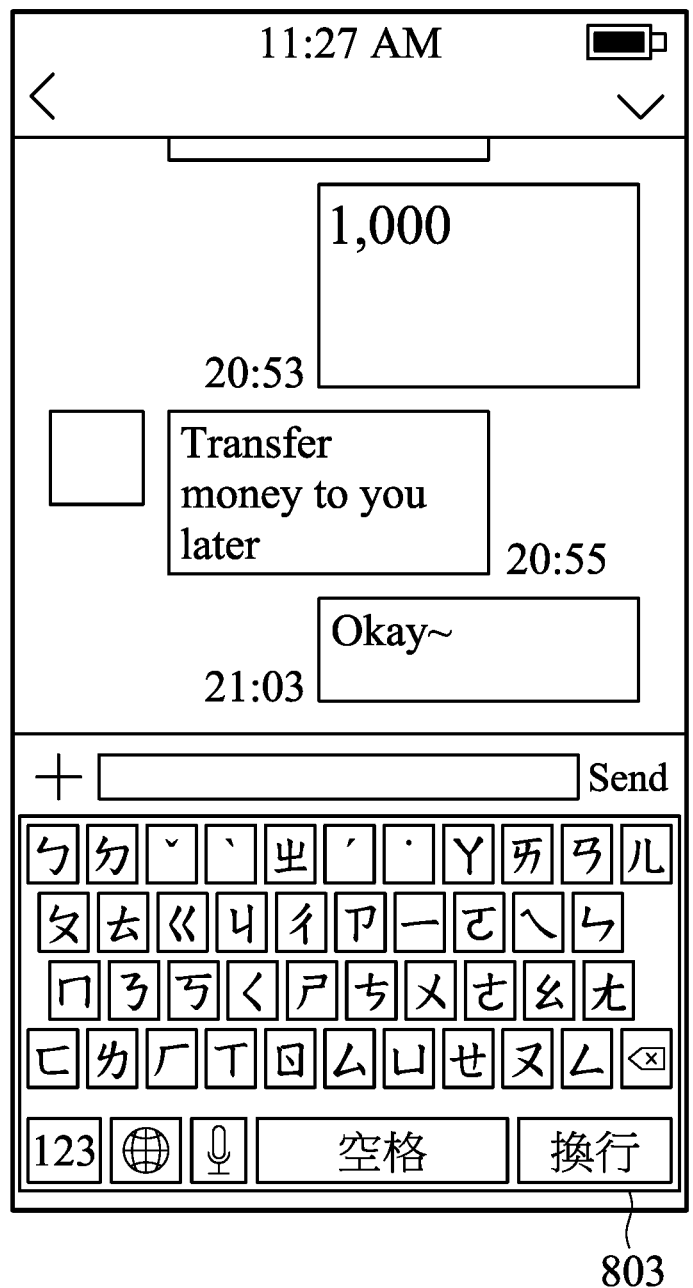
Figure 8D:
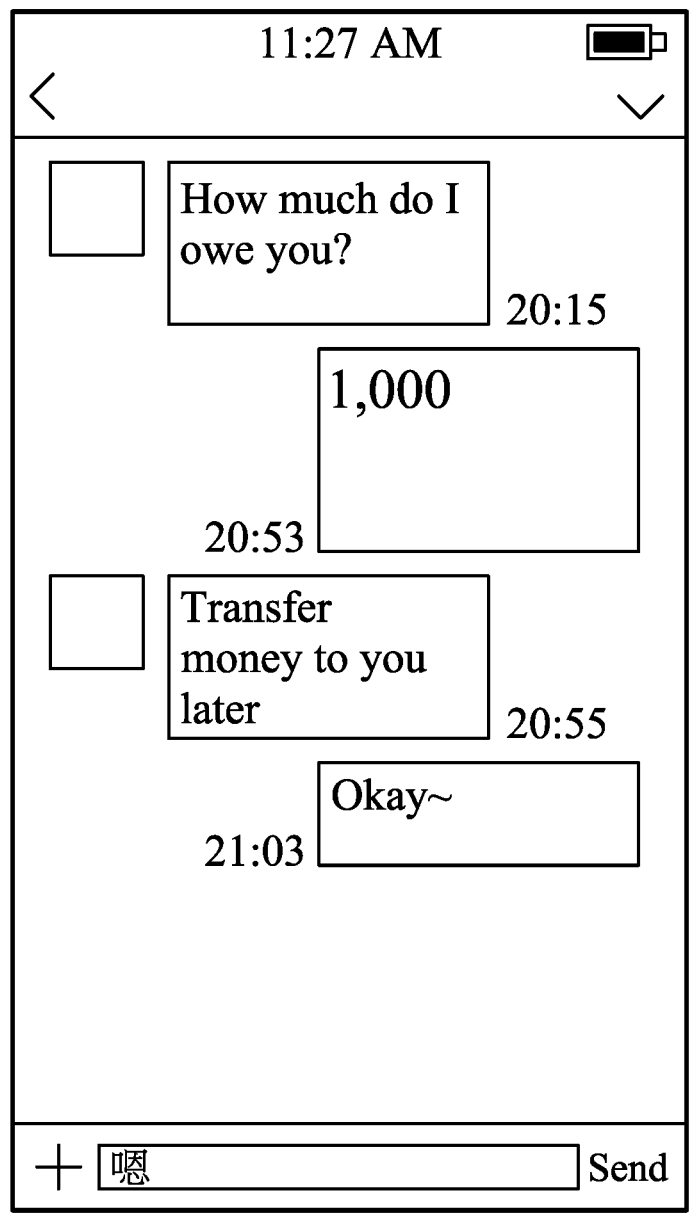
Figure 8E:
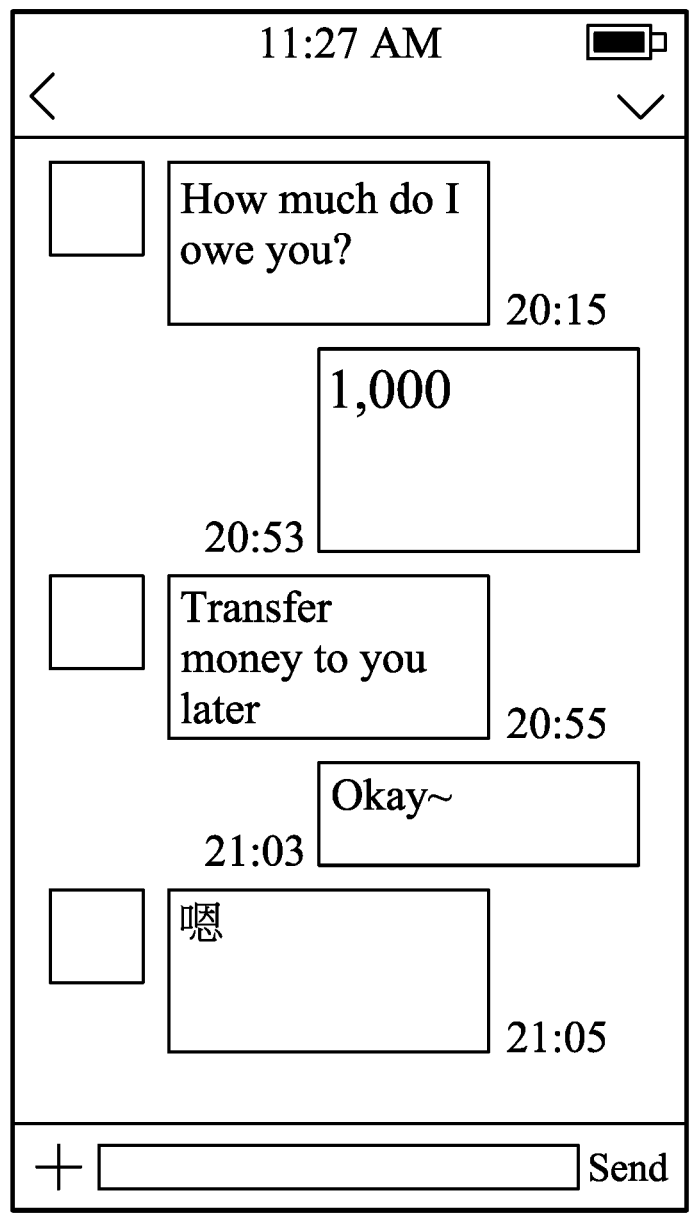

FIGS. 8A to 8E are schematic diagram illustrating exemplary embodiments of operation screens for the input method switching. As shown in FIG. 8A, the client APP displays the operation screen image of the remote ANDROID operating system including a text input box 801 on the screen of the local operating system. As shown in FIG. 8B, when the user touches the text input box on the screen of the local operating system, the touch event is transmitted to the remote operating system so that the remote operating system automatically invokes the remote input method to display the remote input keyboard 802 and the remote operating system broadcasts a notification to the daemon. Because the client APP is displaying the operation screen image of the remote operating system, the remote input keyboard will be displayed on the screen of the local operating system first. As shown in FIG. 8C, the daemon sends an response message to notify the client APP to perform the activation operation of the local input method, so that when the client APP receives the response message, it automatically wakes up the local input method and uses the local input keyboard 803 of the local input method to cover the remote input keyboard originally displayed on the screen of the local operating system, allowing the user uses the local input keyboard for text inputting. As shown in FIG. 8D, the user enters the text to be input into the text input box 801 using the local input keyboard of the local input method. The client APP receives the text inputs from the local input method and provides the text inputs to the daemon to transmit the text inputs to the remote operating system such that the text inputs are provided to the remote APP, thereby causing the remote operating system to display the input content on the corresponding display position. Next, the user performs an operation indicating that the user input has been completed. In this example, the user can perform an end-of-input operation by touching a "Send" button displayed on the screen of the local operating system. The client APP notifies the remote operating system of user operations. In response to the above user operation, the remote operating system disables the remote input method to close the remote input keyboard 802 on the remote operating system, and the remote operating system broadcasts a second message to notify the daemon. The remote operating system then inform the local operating system at client end to perform a hiding operation of the local input method through the daemon. Therefore, the local input keyboard 803 is also collapsed, as shown in FIG. 8E.

Figure 9:
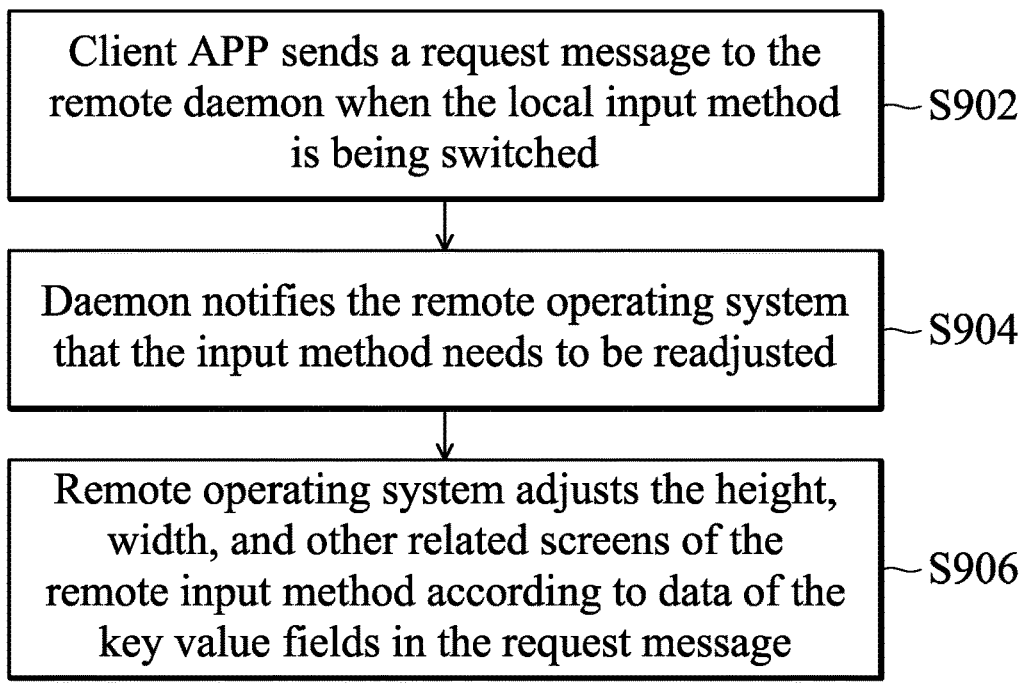
FIG. 9 is a flowchart of an input method switching method according to another embodiment.

In some embodiments, the present application further provides an input method switching method that supports flexible switching between local input methods. In one embodiment, it is assumed that the local input method includes at least a first input method (e.g., the phonetic input method) and a second input method (e.g., the voice input method). When it is detected that the local input method is being switched from the first input method to the second input method, the mobile communication device 10 may send a second screen adjustment notification to the remote server 30 via the communication device 12, wherein the second screen adjustment notification includes height and width information of a second input keyboard corresponding to the second input method, so that the remote server 30 may adjust the displayed keyboard position according to the height and width information of the second input keyboard. FIG. 9 is a flowchart of an input method switching method according to another embodiment. Please refer together with FIG. 1, FIG. 2, FIG. 6 and FIG. 9. The input method switching method of the application may be applied to the VMI environment described in FIG. 6 and may be used for a switching operation of an input method between a local end (i.e., the mobile communication device 10) and a remote end (i.e., the remote server 30).

In step S902, when the local input method is being switched (for example, switched from the first input method to the second input method), the client APP sends a request message to the remote daemon. When the daemon receives the request message sent by the client APP, in step S904, the daemon notifies the remote operating system that the input method needs to be readjusted. Thus, in step S906, the remote operating system adjusts the height, width, and other related screens of the remote input method according to the data of the key value fields in the request message. Accordingly, the remote operating system can dynamically adjust the position of the corresponding local input keyboard originally displayed on the remote screen according to the width and height data for the keyboard of different local input methods. When it is determined that the local input keyboard of the switched local input method may cover the previously displayed data, the original display screen may be properly moved upward so that the local input keyboard of the switched local input method after switching the local input method does not cover the input data on the remote screen.

In some embodiments, based on security considerations, when the user needs to input some encryption or security data, such as a password, if the local input method is still adopted, a key code (key code) for which will be transmitted to the remote operating system at this time. Once the key code is intercepted and decoded directly by others, there will be doubts about the leakage of important data. Therefore, the input method switching mechanism of the present application may further consider to automatically switching to the remote input method based on the attribute data for the input box. In one embodiment, the mobile communication device 10 may receive a third notification including attribute data of the input box from the remote server 30, and select to perform the activation operation or the hiding operation of the local input method to display or hide the local input keyboard in response to the attribute data for the input box. The attribute data for the input box can be classified into two attributes of a normal box and an encryption box. In response to the attribute data for the input box representing an encryption input box, the mobile communication device 10 performs the hiding operation of the local input method to hide the local input keyboard via the display device 11 and displays the remote input method keyboard, allowing the user to use the remote input method keyboard for inputting operation. Specifically, the remote end (i.e., the remote server 30) may transmit the attribute data for the input box to the local end (i.e., the mobile communication device 10). The attributes of the attribute data for the input box may be classified into two attributes of a normal box and an encryption box, which respectively represented by a number of "0" and "1". When the local end receives the attribute data for the input box, it may determine whether the input box is an encryption box according to its value. In this embodiment, the encryption box is indicated by the number of "1". That is, when the local end receives the attribute data for the input box whose value is "1", it determines that the input box is an encryption box and automatically enables a safe mode to use the keyboard of the remote input method for inputting. When the local end receives the attribute data for the input box whose value is "0", it determines that the input box is a normal box and the remote input method is not required to be switched to and the inputting is continued through the local input method using the local input method keyboard.

Figure 10:
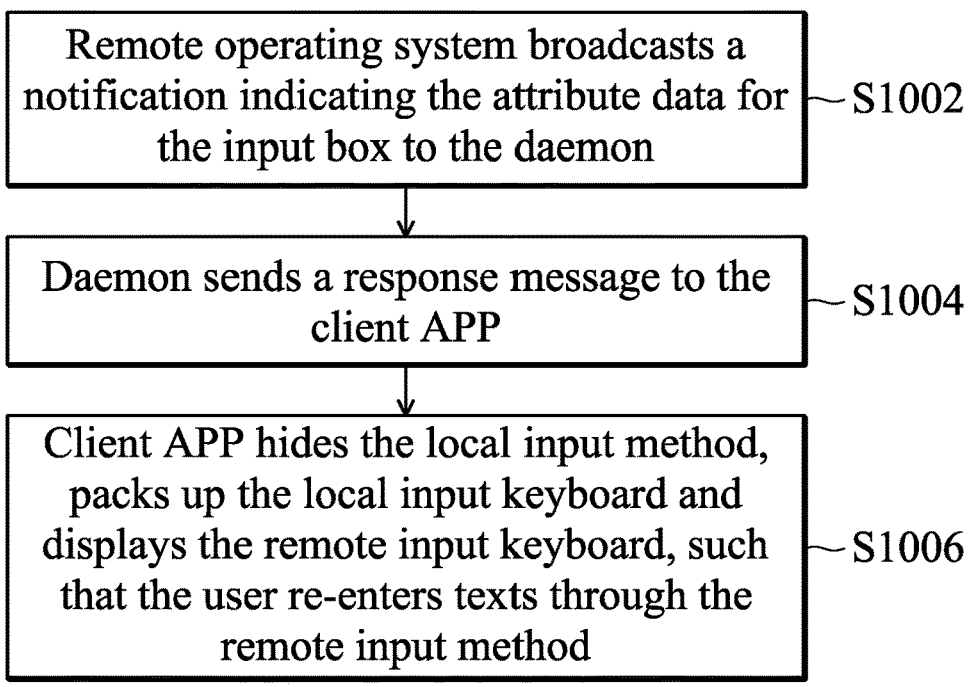
FIG. 10 is a flowchart of an input method switching method for automatically switching to the remote input method according to the attribute data for the input box according to another embodiment.

FIG. 10 is a flowchart of an input method switching method for automatically switching to the remote input method according to the attribute data for the input box according to another embodiment. Please refer together with FIG. 1, FIG. 2, FIG. 6 and FIG. 10. The input method switching method of the application may be applied to the VMI environment described in FIG. 6 and may be used for a switching operation of an input method between a local end (i.e., the mobile communication device 10) and a remote end (i.e., the remote server 30).

First, in step S1002, the remote operating system broadcasts a notification indicating the attribute data for the input box to the daemon. In step S1004, the daemon sends a response message to the client APP. In this embodiment, it is assumed that the attribute data for the input box is an encryption box, so the daemon sets the attribute data in the response message to be "1". When the client APP receives the attribute data for the input box whose value is "1", it determines that the attribute data for the input box is an encryption box. Therefore, in step S1006, the client APP hides the local input method, packs up the local input keyboard and displays the remote input keyboard, such that the user re-enters texts through the remote input method. Meanwhile, a touch event that represents the touch position of the input key is being transmitted to the remote operating system instead of transmitting the key value or string for the input key. Thus, when combined with a dynamic keyboard design, even if the transmitted data is intercepted and directly decoded during the transmission, correct user inputs cannot be known, thus reducing the risk of passwords or other important personal information being stolen/skipped and further enhancing data security.

In another embodiment, the input method switching mechanism of the present application may further allow the user to decide whether to enable a safe mode or not. In the safe mode, only the remote input method can be used. For example, in one embodiment, the input method switching mechanism of the present application may provide an option to allow the user to enable the safe mode by way of function selection in the pre-initialization stage. In this embodiment, when the user activates the safe mode, the remote server 30 generates a fourth notification with an option data indicating that the safe mode is enabled to the mobile communication device 10 via the response message. When the mobile communication device 10 receives the fourth notification from the remote server 30, it knows that the safe mode is enabled according to the option data, and perform the hiding operation of the local input method to hide the local input keyboard displayed on GUI and display the remote input keyboard via the display device 11, allowing the user to input using the remote input keyboard. When the safe mode is enabled, it will be forced to use the remote input keyboard. In this case, a touch event that represents the touch position of the input key is being transmitted to the remote operating system instead of transmitting the key value or string for the input key. Thus, a dynamic keyboard design can be combined to achieve encryption requirements and achieve a higher level of encryption design.

In some embodiments, as some versions of the local input method may generate redundant key events, the present application may further provide an embodiment of a method for filtering key values, so as to eliminate the redundant key events by way of determining the unique code (Unicode). The specific Unicode is a set of predefined Unicode character combinations corresponding to the selected local input method. For example, in the case of phonetic transcription, the predefined Unicode combination may be the Unicode representing 37 phonetic symbols including phonetic symbols "ㄅ", "ㄆ", "ㄇ" . . . ~ "ㄧ", "ㄨ", "ㄩ" ("\ u3105"~"u3129") and the Unicode for the phonetic symbol tonal symbols (e.g., the second tone (') has the Unicode "\ u02CA", the third tone (ˇ) has the Unicode "\ u02C7", the fourth tone (ˋ) has the Unicode "\ u02CB" or the light tone (˙) has the Unicode "\ u02D9"). When the corresponding Unicode of the input signal belongs to one of the predefined Unicode combinations, the input signal will be filtered out. In other words, the input signal will not be packed as an output string. As a result, redundant phonetic events can be eliminated by identifying the Unicode.

On the other hand, the same APP may have different implementations and practices for the same operation behavior on different versions of an operating system (e.g., ANDROID operating system). For example, a corresponding key code for a search operation of the Google Play APP is the Enter key when the OS version being used is ANDROID-5 while the corresponding key code for which is a line feed key when the OS version being used is ANDROID-7.

Therefore, in order to solve the above-mentioned problem, an embodiment of the present application may further provide an input method converter for additionally determining the Unicode of the input signal and the version of the APP to which the APP signal belongs, filtering redundant key events according to the Unicode, and converting the specific key code for its specific behavior to correspond to the correct operation behavior according to the difference of APP version. Specifically, the input method converter is an APP stored in the storage device 14. When it is loaded and executed by the controller 13, it detects, when the local end switches the input method, all the key signals, intercepts the extra keystroke input during the intermediate input process and only sends the last "text" to the remote end. For example, when the user wants to input the word "辦" at the local end, the user inputs "ㄅ", "ㄢ", etc. and then enters "辦" after word selecting. The input method converter filters out the keys inputted in the intermediate input process "ㄅ", "ㄢ" and only sends the last "辦" to the remote end. In addition, the input method converter may further transmit a corresponding converted key code or key value to the remote end according to the version of the operating system being used, such that the remote operating system can correctly perform the operations of the remote APP. The controller 13 may further be configured to load and execute instructions or program codes from the storage device 14 to run the aforementioned input method converter.

In one embodiment, the mobile communication device 10 may receive the first input signal of the first input method or the second input method of the local end through the input method converter, convert the first input signal into a second input signal corresponding to the remote input method, and transmit the second input signal to the remote server 30. In another embodiment, the mobile communication device 10 may determine whether the first input signal is a specific identification data (for example, any one of the predefined Unicode combinations) through the input method converter and determine to remove the first input signal from the input sequence when the first input signal is the specific identification data. The above specific key code is also referred to as a converted key code. In still another embodiment, the mobile communication device 10 may determine whether the first APP currently being executed is a specific application (APP) through the input method converter, and in response to determining that the first APP is the specific APP, convert the key value of the input signal to obtain a converted key value and send the converted key value to the remote server 30. For example, the converted key code is set to the key code of the Enter key when a search operation of the Google Play APP is being performed on the ANDROID-5, while the converted key code is set to the key code of the line feed key when the search operation of the Google Play APP is being performed on the ANDROID-7. Through the input method converter of the application to deal with different situations, a variety of ANDROID/iOS input methods can be bridged.

Figure 11:
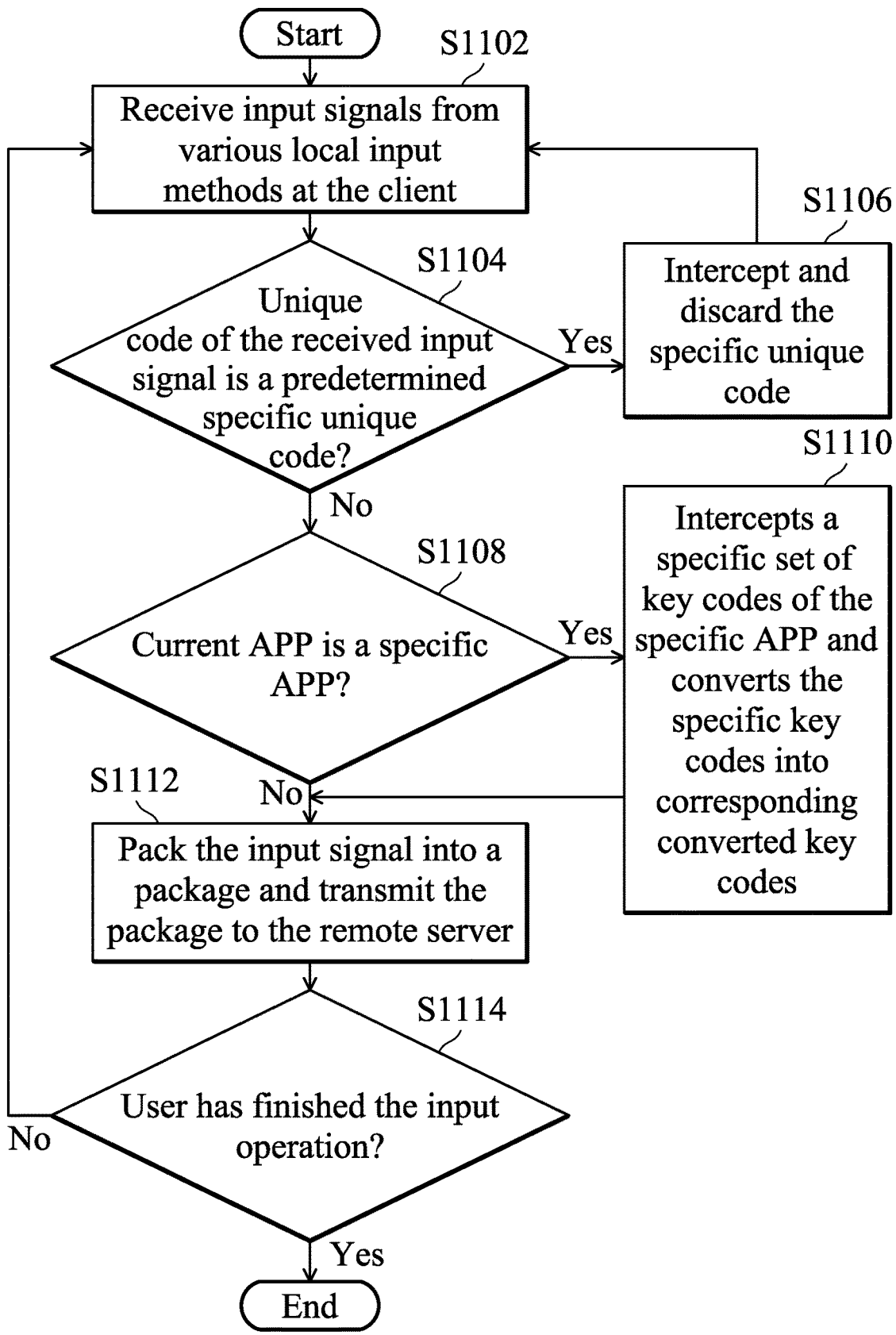
FIG. 11 is a flowchart of a filtering and conversion method of an input signal according to an embodiment.

FIG. 11 is a flowchart of a filtering and conversion method of an input signal according to an embodiment. Please refer together with FIG. 1, FIG. 2, FIG. 6 and FIG. 11. The filtering and conversion method of an input signal of the application may be applied to the VMI environment described in FIG. 6 and may be used for filtering and conversion of the input signal at a local end (i.e., the mobile communication device 10) when the input method converter is loaded and executed by the controller 13.

First, the input method converter receives input signals from various local input methods at the client (step S1102), and determines whether the Unicode of the received input signal is a predetermined unique code (step S1104). For example, in one embodiment, it is determined whether the unique code of the input signal is a predetermined unique code by determining whether the unique code of the input signal is any of the unique code combination "\ u3105"~"\ u3129", "u02CA", "u02C7", "\ U02CB" and "\ u02D9", but the application is not limited thereto. When the unique code of the input signal is a specific unique code (Yes in step S1104) (e.g., the unique code of the input signal is "\ u3105"), which indicates that it is an input signal during the input intermediate process, the input method converter intercepts this specific unique code and discards the unique code so that no input signal corresponding to the specific unique code exists in the final character string (step S1106). After the input method converter intercepts and discards the specific unique code, the process returns to step S1102 to continue receiving the next input signal and determine the unique code.

When the unique code of the input signal is not a specific unique code (No in step S1104) (for example, the unique code of the input signal is "\ u3130"), it is determined whether the current APP is a specific APP (step S1108). For example, determining whether the current APP is a specific APP is to determine whether the current APP is any one of a group of predefined APPs that are APPs with version variation and requires to perform a key value conversion, such as, the above-mentioned Google Play.

When it is determined that the current APP is a specific APP (Yes in step S1108) (for example, the current APP is Google Play), the input method converter intercepts a specific set of key codes of the specific APP and converts the specific key code into a corresponding converted key code based on the version information of currently used operating system (step S1110) (for example, when the search operation of Google Play at ANDROID-7 is to be performed, the converted key code can be set as the key code of the line feed key), and then step S1112 is performed.

When it is determined that the current APP is not a specific APP (No in step S1108) (for example, the current APP is an APP other than Google Play), which indicates that it is the final selected character for the word selection, the input method converter packs the input signals into a package and transmit the package to the remote server (step S1112). Next, the input method converter determines whether the user has finished the input operation (step S1114). In one embodiment, the input method converter may determine whether the user has finished the input operation by determining whether the user has triggered a specific key event, such as whether the user continuously presses the enter key twice or presses the designated key. When the user continuously presses the enter key twice or presses the designated end input key, the specific key event is triggered, and thus it is determined that the user has finished the input operation. When the input method converter determines that the user has finished the input operation (Yes in step S1114), the flow ends. When the input method translator determines that the user's the input operation has not been finished (No in step S1114), the flow returns to step S1102 and continues with the subsequent determination of whether there is a specific unique code and/or a specific APP and then intercepts it and/or convert it to a converted unique code if any until it is determined that the user has finished the input operation. The input method translator and unique code determination mechanism of the present application can easily bridge various ANDROID/iOS input methods supported by the local end and intercept unnecessary input signals in the grouping process of each input method, and thus can support various types of input methods, such as phonetic input method, Cangjie input method, voice input method, handwriting input method and so on.

Therefore, the mobile communication devices based on the VMI and related input method switching methods of the present application can provide the dual-mode input method control flow and automatic switching mechanism between the local input method and the input method of the remote server, user experience and fluency. Moreover, the mobile communication devices based on the VMI and the related input method switching methods of the present application can bridge various local input methods so that the user can freely convert favorite or commonly used local input methods to perform various input operations to allow the user to automatically switch local input method and can automatically forcibly switch to the remote input method or enable safe mode to use the remote input method for the input operation according to the attribute data for the input box, thus increasing the security of data transmission and having better results and higher data security as compared with the existing VMI methods, so as to effectively reduce the risk of misappropriation/skimming of important data by unauthorized persons.

Methods, or certain aspects or portions thereof, may take the form of program codes (i.e., executable instructions) embodied in tangible media, such as floppy diskettes, CD-ROMS, hard drives, or any other machine-readable storage medium, wherein, when the program codes is loaded into and executed by a machine such as a computer, the machine thereby becomes an apparatus for practicing the methods. The methods may also be embodied in the form of program codes transmitted over some transmission medium, such as electrical wiring or cabling, through fiber optics, or via any other form of transmission, wherein, when the program codes is received and loaded into and executed by a machine such as a computer, the machine becomes an apparatus for practicing the disclosed methods. When implemented on a general-purpose processor, the program codes combines with the processor to provide a unique apparatus that operates analogously to application specific logic circuits.

In addition, various illustrative logical blocks, modules, and circuits, as well as various aspects disclosed herein, may be implemented in integrated circuits (ICs), access terminals, access points; or be executed by the ICs, access terminals or access points. The IC may be implemented by a general purpose processor, a digital signal processor (DSP), an application specific integrated circuit (ASIC), a field programmable gate array (FPGA) or other programmable logic devices, discrete gates or transistor logic, discrete hardware components, electronic components, optical components, mechanical components, or a combination of any of the above to accomplish the functions described herein; and may execute codes or instructions that exist in the integrated circuit, the integrated circuit, or both. The general purpose processor may be a microprocessor, or may be any conventional processor, controller, microcontroller, or state machine. The processor may be comprised of a combination of computer devices such as a combination of a digital signal processor and a microcomputer, a plurality of groups of microcomputers, one or more groups of microcomputers, and a digital signal processor core, or any other similar configuration.

While the application has been described by way of example and in terms of exemplary embodiment, it is to be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A mobile communication device based on a virtual mobile infrastructure (VMI), comprising:
   a display device configured to display a graphical user interface (GUI);
   a communication device configured to provide a network connection to a remote server;
   a storage device configured to store machine-readable instructions or program codes; and
   a controller operatively coupled to the communication device and the storage device, and configured to load and execute instructions or program codes from the storage device to perform an input method switching method comprising the following operations during performing a first application (APP) of the remote server:
   displaying an operation screen of the first APP on the GUI; receiving a first notification indicating that a remote input keyboard of a remote input method has enabled from the remote server via the communication device; in response to the first notification, performing an activation operation of a local input method, using a local input keyboard of the local input method to cover the remote input keyboard displayed on the GUI via the display device to enable a user to use the local input method for inputting and to transmit user inputs to the remote server via the communication device to display the user inputs on respective remote location; and receiving a second notification indicating that the remote input keyboard has disabled from the remote server via the communication device and in response to the second notification, performing a hiding operation of the local input method to hide the local input keyboard displayed on the GUI via the display device;

wherein the local input method comprises a first input method and the input method switching method further comprises:

in response to the first notification, transmitting a first screen adjustment notification to the remote server via the communication device, wherein the first screen adjustment notification comprises height and width information of a first input keyboard of the first input method such that the remote server adjusts a displayed keyboard position according to the height and width information of the first input keyboard.

2. The mobile communication device as claimed in claim 1, wherein the local input method further comprises a second input method, and the input method switching method further comprises:

detecting that the local input method is switched from the first input method to the second input method; and transmitting a second screen adjustment notification to the remote server via the communication device, wherein the second screen adjustment notification comprises height and width information of a second input keyboard of the second input method, such that the remote server adjusts the displayed keyboard position according to the height and width information of the second input keyboard.

3. The mobile communication device as claimed in claim 2, wherein the controller is further configured to load and execute the instructions or program codes from the storage device to operate an input method converter, and the input method switching method further comprises:

receiving a first input signal for the first input method or the second input method via the input method converter;

converting the first input signal into a second input signal corresponding to the remote input method; and transmitting the second input signal to the remote server.

4. The mobile communication device as claimed in claim 3, wherein the first input method and the second input method include a speech input method, a handwriting input method, a phonetic input method, and a Cangjie input method.

5. The mobile communication device as claimed in claim 3, wherein the input method switching method further comprises:

determining whether the first input signal is a specific identification data via the input method converter; and removing the first input signal via the input method converter in response to determining that the first input signal is the specific identification data.

6. The mobile communication device as claimed in claim 5, further comprising:

determining whether the first application is a specific application via the input method converter; and in response to determining that the first application is the specific application, converting a key value of the first input signal to obtain a converted key value and transmitting the converted key value to the remote server.

7. The mobile communication device as claimed in claim 1, wherein the input method switching method further comprises:

receiving a third notification from the remote server, wherein the third notification includes attribute data for an input box; and selectively performing the activation operation or the hiding operation of the local input method in response to the attribute data for the input box.

8. The mobile communication device as claimed in claim 7, wherein the input method switching method further comprises:

in response to the attribute data for the input box representing an encryption input box, performing the hiding operation of the local input method to hide the local input keyboard on the GUI via the display device and to display the remote input keyboard to enable the user to use the remote input method for inputting.

9. The mobile communication device as claimed in claim 7, wherein the input method switching method further comprises:

receiving a fourth notification from the remote server, wherein the fourth notification includes option data; and in response to the option data, performing the hiding operation of the local input method to hide the local input keyboard and display the remote input keyboard on the GUI via the display device such that the user uses the remote input method for inputting.

10. An input method switching method, applied to a mobile communication device based on a virtual mobile infrastructure (VMI), wherein the mobile communication device is connected to a remote server via a network, the input method switching method comprising displaying an operation screen for a first application (APP) of the remote server on a graphical user interface (GUI);

receiving a first notification indicating that a remote input keyboard of a remote input method has enabled from the remote server;

in response to the first notification, performing an activation operation of a local input method, using a local input keyboard of the local input method to cover the remote input keyboard displayed on the GUI to enable a user to use the local input method for inputting and to transmit user inputs to the remote server to display the user inputs on respective remote location via the network; and receiving a second notification indicating that the remote input keyboard has disabled from the remote server and in response to the second notification, performing a hiding operation of the local input method to hide the local input keyboard displayed on the GUI;

wherein the local input method comprises a first input method, and the input method switching method further comprises:

in response to the first notification, transmitting a first screen adjustment notification to the remote server, wherein the first screen adjustment notification comprises height and width information of a first input keyboard of the first input method, such that the remote server to adjust a displayed keyboard position according to the height and width information of the first input keyboard.

11. The input method switching method as claimed in claim 10, wherein the local input method further comprises a second input method, and the input method switching method further comprises:

detecting that the local input method is switched from the first input method to the second input method; and transmitting a second screen adjustment notification to the remote server,
wherein the second screen adjustment notification comprises height and width information of a second input keyboard of the second input method, such that the remote server adjusts the displayed keyboard position according to the height and width information of the second input keyboard.

12. The input method switching method as claimed in claim 11, further comprising:
provide an input method converter;
receiving a first input signal for the first input method or the second input method;
converting the first input signal into a second input signal corresponding to the remote input method; and
transmitting the second input signal to the remote server.

13. The input method switching method as claimed in claim 12, wherein the first input method and the second input method include a speech input method, a handwriting input method, a phonetic input method, and a Cangjie input method.

14. The input method switching method as claimed in claim 12, further comprising:
determining whether the first input signal is a specific identification data via the input method converter; and
removing the first input signal via the input method converter in response to determining that the first input signal is the specific identification data.

15. The input method switching method as claimed in claim 14, further comprising:
determining whether the first application is a specific application via the input method converter; and
in response to determining that the first application is the specific application, converting a key value of the first input signal to obtain a converted key value and transmitting the converted key value to the remote server.

16. The input method switching method as claimed in claim 10, further comprising:
receiving a third notification from the remote server, wherein the third notification includes attribute data for an input box; and
selectively performing the activation operation or the hiding operation of the local input method in response to the attribute data for the input box.

17. The input method switching method as claimed in claim 16, further comprising:
in response to the attribute data for the input box representing an encryption input box, performing the hiding operation of the local input method to hide the local input keyboard on the GUI and to display the remote input keyboard to enable the user to use the remote input method for inputting.

18. The input method switching method as claimed in claim 16, further comprising:
receiving a fourth notification from the remote server, wherein the fourth notification includes option data; and
in response to the option data, performing the hiding operation of the local input method to hide the local input keyboard and display the remote input keyboard on the GUI such that the user uses the remote input method for inputting.

* * * * *